Figure 1:
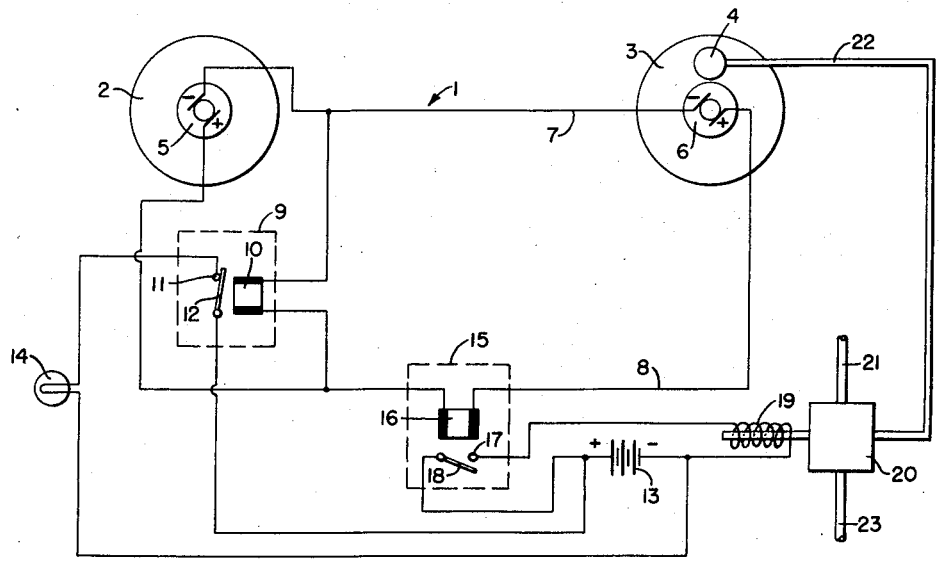

May 17, 1960     F. H. HIGHLEY     2,937,051

WHEEL CONSTANT SLIP CONTROL DEVICE AND METHOD OF BRAKING

Filed April 29, 1957

INVENTOR.
FRANK H. HIGHLEY
BY

ATTORNEY

United States Patent Office 2,937,051
Patented May 17, 1960

2,937,051

WHEEL CONSTANT SLIP CONTROL DEVICE AND METHOD OF BRAKING

Frank H. Highley, Canton, Ohio, assignor to The Goodyear Tire & Rubber Company, Akron, Ohio, a corporation of Ohio Application April 29, 1957, Serial No. 655,817

5 Claims. (Cl. 303—21)

This invention relates to methods of controlling the braking action on a braked wheel so as to produce a constant slip of the wheel with relation to the ground to obtain good braking action on the wheel.

Heretofore several different types of control means have been provided for regulating brake action and preventing the skidding of braked wheels, for example, of aircraft wheels during landing operations of an aircraft wherein efficient brake action is required to stop the aircraft. The present method and control mechanism comprises a relatively uncomplicated electrical control circuit to regulate the rotational speed of a braked wheel with relation to that of an unbraked wheel and to maintain a desired predetermined value of slip for the braked wheel with relation to the surface over which the wheel would be rolling during, for example, landing of an aircraft.

The general object of the present invention is to provide a new and improved type and method of control for the braking action on an aircraft wheel in order to maintain the braked wheel slipping at a substantially constant and predetermined rate with regard to the ground over which the wheel is passing for good braking efficiency.

Another object of the invention is to provide a brake control which automatically is rendered inoperative as the vehicle on which the control is carried approaches a stop, and which can give visual indication of such inoperativeness when such condition is established.

A further object of the invention is to utilize two separate control generators individually in association with a braked wheel and an unbraked wheel for controlling brake action, which generators are directly coupled in opposition with only one control connected in circuit therewith.

Another object of the invention is to reduce the amount of heat energy dissipated by a brake when stopping a rotating wheel by producing a substantially constant relative slip between the wheel and the surface over which it moves and to dissipate heat energy at such wheel periphery.

Yet another object of the invention is to obtain the high deceleration by brake action so that good braking conditions are achieved, and to use a minimum of electric control means in the apparatus of the invention.

Another object of the invention is to provide controls in combination with both a braked wheel and an unbraked wheel of an aircraft to aid in obtaining the desired amount of braking action on the braked wheel to produce a high coefficient of friction of such braked wheel with the ground.

The foregoing and other objects and advantages of the invention will be made more apparent as the specification proceeds.

Figure 2:
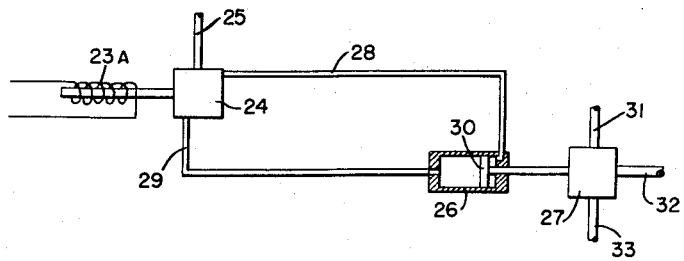

For a better understanding of the invention, reference should be had to the accompanying drawings wherein:

Fig. 1 illustrates diagrammatically the apparatus of the invention shown in combination with a wiring and control circuit used for controlling brake action on one of a pair of rotating wheels; and Fig. 2 is a modification of a portion of the control circuit of the invention.

When referring to the corresponding parts in the specification and shown in the drawings, corresponding numerals are used to facilitate comparison between such corresponding parts.

The present invention relates to the method in an airplane, or other vehicle of a brake control method comprising the steps of comparing the velocity of a braked tire with the velocity of an unbraked wheel to obtain a difference, braking the tire to a slip condition with its support when less than about 10 m.p.h. velocity difference exists between the braked tire and the unbraked wheel, releasing the braking of the tire when more than about 10 m.p.h. velocity difference exists between the braked tire and the unbraked wheel, and correlating the braking and release of braking so as to maintain the braked tire during the braking operation in a constant slip condition of about 10 m.p.h. velocity difference with its support whereby upon braking heat is generated both between the tire and runway and in the braking mechanism.

In the accompanying drawings, the constant slip control apparatus or system of the invention is indicated as a whole by the numeral 1. This control system or apparatus is used in conjunction with an unbraked support wheel 2 and with a support wheel 3 that is shown as having a conventional type of a brake 4 associated therewith and shown diagrammatically in the drawings. These support wheels 2 and 3 usually are used in combination with an aircraft landing gear (not shown) inasmuch as the constant slip control apparatus 1 is particularly suitable for use with an airplane, and the unbraked support wheel 2 would be the nose wheel of the airplane.

The drawings show that a conventional type of a D.C. generator 5 is associated with the unbraked wheel 2 and is suitably and positively driven by such unbraked wheel at the same speed or at a speed proportional to the rotational speed of such unbraked wheel. A similar D.C. generator 6 is associated with the braked wheel 3 and is operatively connected to and positively driven thereby in any desired manner to rotate at the same speed as the braked wheel, or at a speed proportional thereto. The generators 5 and 6 are so constructed that they have the same voltage outputs when driven by the wheels 2 and 3 that are then rotating at the same speed. Suitable circuit means connect the generators 5 and 6 in opposition and leads 7 and 8 are shown extending between the negative and positive output terminals, respectively, of such generators 5 and 6 so that a differential voltage, if any exists in such generators, can be used for operating constant slip control means, as hereinafter described in more detail.

One important control provided in the control apparatus 1 comprises a suitable relay 9 which has an operating coil 10 provided therefor connected across the terminals of the unbraked wheel generator 5 and which has a pair of normally closed contacts 11 and 12 controlled by the relay 9 to be opened when the relay is actuated by flow of a predetermined value of current through the operating coil 10. Such relay 9 is adapted to be actuated and open the contacts 11 and 12 whenever the braked wheel is rotating above a predetermined speed, such as about 15 miles per hour. The contacts 11 and 12 connect to a suitable power source such as a battery 13 through a signal light 14. Hence the signal light 14 will be energized below speeds of 15 to 20 miles an hour to show that the control apparatus of the invention is inoperative when the airplane on which the wheels are positioned is parked, or the aircraft is slowed to a low ground speed. A manual control switch (not shown) usually would be connected in the circuit for the signal light 14 to turn it off when the airplane is not in use.

A second control relay 15 is provided in the control apparatus 1 and it has an operating coil 16 connected in series in the lead 8 to be actuated only when a predetermined differential voltage output exists in the generators 5 and 6. The relay 15 has contacts 17 and 18 operatively associated therewith and controlled thereby which contacts are closed only when a predetermined value of operating voltage is applied to the coil 16. The contacts 17 and 18, when closed, complete a circuit from a conventional power supply member, such as the battery 13, to a control means which in this instance comprises an operating coil 19 for a solenoid valve 20 to change the setting of such valve and brake action as hereinafter described.

Energization of the operating coil 19 is adapted to effect a release or reduction of braking forces and brake action by the multiple positions of the solenoid valve 20. This solenoid valve 20 has one tube or conduit 21 extending therefrom for receipt of hydraulic fluid from a brake control member, not shown, which is responsive to manual or other actuation of the controls for the brake 4, as by the pilot of the airplane during landing operations. The solenoid valve 20 also has a line or conduit 22 extending therefrom to the brake 4 to transmit braking pressures thereto under proper operating conditions. A drain or return line 23 also is connected to the solenoid valve 20 to permit flow or drain of hydraulic fluid from the line 22 back into the hydraulic system to which the brake control is connected by a release of the braking pressure when the solenoid valve is actuated.

From the foregoing, it will be realized that the operating coil 19 is energized when the unbraked wheel 2 is rotating above about 15 m.p.h. and the wheel differential speeds of the wheels 2 and 3 is sufficient, such as that secured at a 10 m.p.h. differential, as to produce the required operating differential voltage between the generators 5 and 6 so that the control relay 15 is actuated and the contacts 17 and 18 are closed. During such period of relay actuation, the coil 19 will hold the solenoid valve 20 in such a position as to release fluid from the brake line 22 and effect a reduction or complete release of the braking action. When such braking action is released or reduced on the support wheel 3, it will tend to turn up to ground speed rapidly and the differential voltage between the generators 5 and 6 will disappear. Then the control relay 15 will automatically open and the solenoid valve 20 will move to permit full return of braking forces to the braked wheel 3 so that the desired control action for such braked wheel can be readily provided by the constant slip control apparatus of the invention.

It is very important that an airplane wheel should not be locked up at even rather slow speed such as below 15 m.p.h. Hence, it is important that the signal light 14 be placed to be readily visible by the pilot who will be warned that he must brake more cautiously and carefully when such light is on as he has no automatic control for substantially all of the time that such light is energized. A slight overlap of the light appearance at 15 m.p.h. ground speed and a definite loss of brake control action at 10 m.p.h. ground speed is thought to be desirable but the light control relay could be set to be actuated at 10 m.p.h. if required.

In the specification, the word "skidding" is used in its normal sense to define that relationsihip existing when a wheel is in a locked or static condition but with the wheel and associated mechanism being moved or moving over the associated support surface. The word "slipping," in contrast to skidding, is that action secured when a wheel is rotating at a different speed, normally less, than the speed at which the vehicle on which the slipping wheel is mounted is itself moving over an associated support surface, such as a runway. The amount of slipping that occurs at any given time can be measured, for example, by comparing the circumferential speeds of an unbraked support wheel in contact with the runway or other support with the circumferential speed of the braked wheel of the vehicle after braking forces have been applied to such wheel to cause it to rotate at a different rotational speed and hence, at a different circumferential speed from that of the unbraked wheel. Such difference in rotational and circumferential speeds between the braked and unbraked wheels measures the slippage of the braked wheel, and this slippage is the slippage velocity of the wheel. Such velocities are measured in miles per hour or feet per second, as desired.

From tests made on conventional types of solenoid control valves available for use in practicing the method of the invention, it has been learned that the response time between the application of energization forces to a commercial type control solenoid until the solenoid is actually in its fully energized position for releasing brake pressure, is approximately .03 second. On de-energization of the solenoid, when it is desired to reapply braking forces, the solenoid releases in approximately .01 second.

If it is deemed necessary to use controls for obtaining more instantaneous action on the solenoid valve 20, some type of a pilot operated valve may be used in place of the solenoid valve 20 shown in the modification of Fig. 2. Thus, instead of the impulses from the control relay 15 being sent to the operating coil for the solenoid valve 20, such impulses are sent to an operating coil 23a of a solenoid operated hydraulic control valve 24 which is smaller than the solenoid valve 20, for example, and lighter in weight, and which has an energization time of .006 second, approximately. The control valve 24 is connected to a hydraulic pressure supply circuit by a conduit 25 and to a cylinder 26 that in turn is used for operating a valve 27. Pressure supply lines 28 and 29 connect to opposite ends of the cylinder 26 to supply pressure alternately to the cylinder to reciprocate a piston 30 and control setting of the valve 27 thereby. Hence, an input pressure conduit 31 supplies pressure to a conduit 32 that connects to the braked wheel 3, or to a return or drain conduit 33, like the solenoid valve 20. The entire energization time by this apparatus for effecting brake release is .006 second, approximately, as referred to hereinbefore. Obviously when the control valve 27 is moved to its open position, some slight interval of time is required for fluid to flow through such valve to the fluid storage reservoir or equivalent portion of the apparatus so that the valve provides some brake pressure release instantaneously but not a complete withdrawal of the braking action. Under normal braking conditions, the braked wheel starts to accelerate within such interval when the brake fluid or pressure is draining from the braking circuit so that the control valve 27 snaps back and forth from its braking to its released position rapidly whereby some braking action is continually exerted upon the braked wheel. The brake control means functions to maintain the approximate 10 m.p.h. slipping condition desired upon such braked wheel.

It will be realized that the time required for a braked wheel to go into a skid condition, when the slipping of the braked wheel would exceed 10 m.p.h., can vary somewhat depending upon the braking forces exerted, the runway conditions, tread constructions, etc. of the braked wheel. However, one typical time interval between the braked wheel being in a satisfactory braked condition of 10 m.p.h. slip, and then to decelerate faster and go into a skid condition, would be a time interval of about .10 of a second. Inasmuch as even a conventional type of a solenoid will release in a .03 second, and immediately start to withdraw the braking action, it will be seen that the deceleration of the wheel can normally be stopped and the wheel be permitted to reaccelerate rapidly without approaching and reaching skid conditions.

By use of the apparatus of the invention, it is possible to obtain a substantially constant slip between the braked wheel 3 and the ground over which the wheel is rolling. By thus maintaining such slip of the wheel at approximately 10 m.p.h. difference, energy is absorbed both in the brake and at the surface of the tire with the attendent liberation of heat. Accordingly, the brake itself can be made smaller and lighter while maintaining the same over all energy absorption.

This application is a continuation-in-part of my copending application Serial No. 449,645, filed August 13, 1954, now abandoned, entitled "Wheel Constant Slip Control Device."

While one complete embodiment of the invention has been disclosed herein, it will be appreciated that modification of this particular embodiment of the invention may be resorted to without departing from the scope of the invention as defined in the appended claims.

What is claimed is:

1. That method of braking a pneumatic tire on a vehicle which includes the steps of determining the velocity difference between a braked tire and an unbraked wheel, braking the tire to a slip condition with the supporting surface when less than about 10 m.p.h. velocity difference exists between the braked tire and the unbraked wheel, releasing the braking of the tire when more than about 10 m.p.h. velocity difference exists between the braked tire and the unbraked wheel, and correlating the braking and release of braking so as to maintain the braked tire during the braking operation in a constant slip condition of about 10 m.p.h. velocity difference with the supporting surface whereby energy is absorbed and braking heat is generated both between the tire and runway and in the braking mechanism.

2. That method of braking a pneumatic tire on an airplane which includes the steps of braking the tire to a slip condition with the runway, releasing the braking of the tire when more than about 10 m.p.h. velocity difference exists between the braked tire and the runway, and correlating the braking and release of braking so as to maintain the braked tire during the braking operation in a constant slip condition of about 10 m.p.h. velocity difference with the runway.

3. That method of braking a pneumatic tire on a vehicle having a plurality of wheels which includes the steps of measuring the peripheral velocity difference between a braked tire and an unbraked wheel, braking the tire to a slip condition with a support when less than about 10 m.p.h. peripheral velocity difference exists between the braked tire and the unbraked wheel, releasing the braking of the tire when more than about 10 m.p.h. peripheral velocity difference exists between the braked tire and the unbraked wheel, and reapplying the braking action when the braked tire has accelerated to a peripheral slip condition of less than about 10 m.p.h. with the support.

4. In combination with a braked wheel, brake means for the braked wheel, and an unbraked wheel; a generator for the unbraked wheel to be driven at a speed proportional to the wheel speed, a generator for the braked wheel to be driven at a speed proportional to the wheel speed, circuit means connecting said generators together in opposition, relay having an actuation coil connected in series in said circuit means to be actuated upon a predetermined voltage output differential of said generators, contact means to be closed by actuation of said relay, a solenoid valve for controlling brake actuation, energization means for controlling said solenoid valve to release brake actuation when energized, circuit and power supply means connecting said contacts in series to said energization means to energize it when said contacts are closed, and a second relay having an actuation coil connected in parallel to the output of the generators for indicating when the speed of the unbraked wheel falls below about 15 miles per hour.

5. That method of braking a pneumatic tire on an airplane which includes the steps of braking the tire to a slip condition with the runway, releasing the brake before a skid condition is reached, reapplying the brake before the tire comes back to non-slipping condition with the runway, and continuing the release and reapplication of the brake to maintain the tire in a constantly slipping condition with the runway, the degree of slip being in an amount to absorb some of the stopping energy between the surface of the tire and the runway and substantially the balance of the energy in the brake.

References Cited in the file of this patent

UNITED STATES PATENTS

| | | |
|---|---|---|
| 2,256,287 | McCune | Sept. 16, 1941 |
| 2,431,445 | Anderson | Nov. 25, 1947 |
| 2,435,310 | Hines | Feb. 3, 1948 |
| 2,515,729 | Morrison | July 18, 1950 |
| 2,529,985 | Williams | Nov. 14, 1950 |
| 2,636,700 | Yarber et al. | Apr. 28, 1953 |
| 2,788,186 | Wilson | Apr. 9, 1957 |
| 2,803,110 | Chittenden | Aug. 20, 1957 |